United States Patent [19]
Erickson et al.

[11] Patent Number: 5,596,365
[45] Date of Patent: Jan. 21, 1997

[54] IMAGE STABILIZATION APPARATUS FOR TELESCOPIC DEVICES

[75] Inventors: John M. Erickson, Ocean; Philip B. Crichton, Freehold, both of N.J.

[73] Assignee: The United States of America as represented by the Secretary of the Army, Washington, D.C.

[21] Appl. No.: 372,548

[22] Filed: Jan. 13, 1995

[51] Int. Cl.⁶ .................................................. H04N 5/232
[52] U.S. Cl. .......................................... 348/208; 348/170
[58] Field of Search ................................. 348/208, 699, 348/701, 170; 354/70

[56] References Cited

U.S. PATENT DOCUMENTS

| | | | |
|---|---|---|---|
| 5,053,876 | 10/1991 | Blissett et al. | 348/208 |
| 5,278,663 | 1/1994 | Hong | 348/208 |
| 5,337,098 | 8/1994 | Imafuji et al. | 354/70 |
| 5,371,539 | 12/1994 | Okino et al. | 348/208 |
| 5,386,264 | 1/1995 | Sekine et al. | 348/208 |

OTHER PUBLICATIONS

K. Uomori et al, "Automatic Image Stabilizing System by Full–Digital Signal Processing", IEEE Trans. on Consumer Electronics, vol. 36, No. 3, at pp. 510–519, Aug. 1990.
M. Oshima et al, "VHS Camcorder with Electronic Image Stabilizer", IEEE Trans. on Consumer Electronics, vol. 35, No. 4, at pp. 749–758, Nov. 1989.
Y. Egusa et al, "An Electronic Video Camera Image Stabilizer Operated On Fuzzy Theory", IEEE Conf. on Fuzzy Systems, at pp. 851–858, Mar. 1992.
J. K. Paik et al, "An Edge Detection Approach to Digital Image Stabilization Based on Tri–State Adaptive Linear Neurons", IEEE Trans. on Consumer Electronics, vol. 37, No. 3, at pp. 521–530, Aug. 1991.
J. K. Paik et al, "An Adaptive Motion Decision System for Digital Image Stabilizer Based on Edge Pattern Matching", IEEE Trans. on Consumer Electronics, vol. 38, No. 3 at pp. 607–616, Aug. 1992.
J. M. Younse, "Mirrors on a Chip", IEEE Spectrum, at pp. 27–36, Nov. 1993.

*Primary Examiner*—Wendy Garber
*Attorney, Agent, or Firm*—Michael Zelenka; William H. Anderson

[57] ABSTRACT

An image stabilization system for telescopic devices uses a method of selecting a suitable, stationary reference image. The user of the instrument views a circular image and a translucent ring concentric to and at an outer edge within the circular image. A translucent circle is superimposed within the width of the concentric ring so as to be able to move along the concentric ring to obtain a reference image. In order to select the reference image, the translucent circle travels, by viewer command, around the concentric ring until a suitable stationary image is observed within the translucent circle. Translation of the reference image within the concentric ring may be reactivated on command as many times as required to get an optimally stationary reference image. Image matching algorithms are then used to determine if the viewing area has moved by keying on and matching the vector movement of the reference image. This image stabilization system is particularly suited to hand-held binoculars or similar equipment. It permits the use of hand-held binoculars at very high magnification.

6 Claims, 1 Drawing Sheet

INITIAL IMAGE

SHIFTED IMAGE

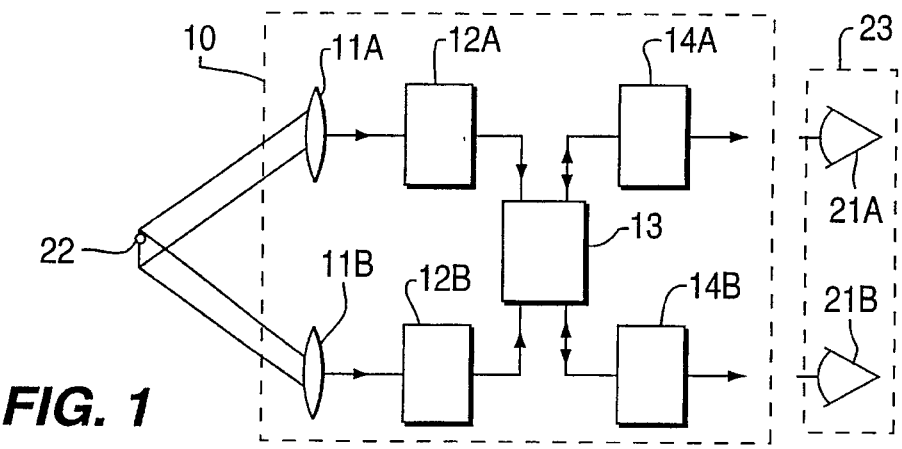
FIG. 1
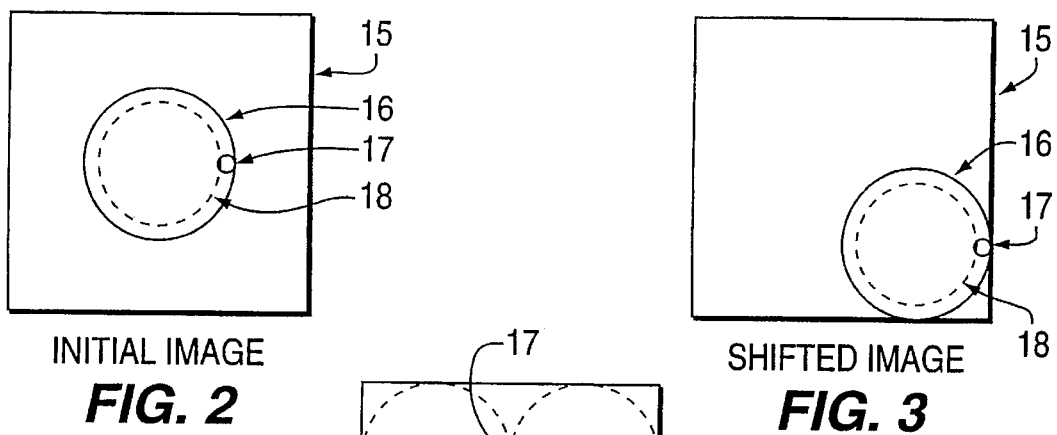
INITIAL IMAGE
FIG. 2
SHIFTED IMAGE
FIG. 3
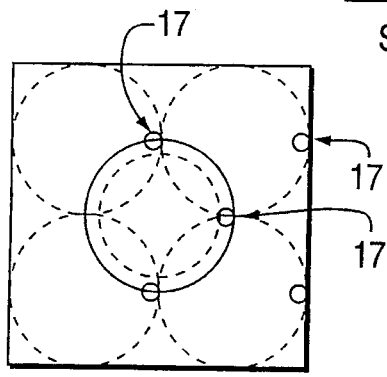
FIG. 4
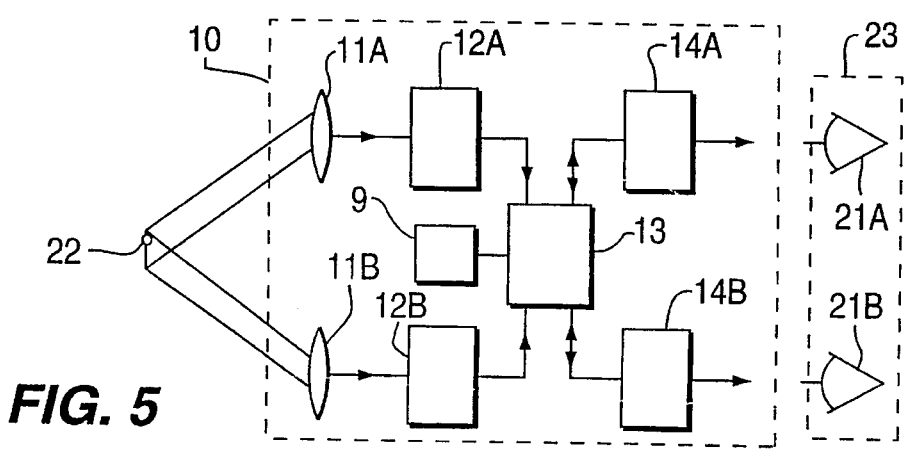
FIG. 5

IMAGE STABILIZATION APPARATUS FOR TELESCOPIC DEVICES

GOVERNMENT INTEREST

The invention described herein may be manufactured, used, and licensed by or for the Government for governmental purposes without the payment to us of any royalty thereon.

FIELD OF THE INVENTION

This invention relates generally to image stabilization systems and more particularly to an image stabilization system for hand-held optical viewing apparatus wherein a small selectable portion of the viewed image is processed to produce a motion-compensated stabilized image.

BACKGROUND OF THE INVENTION

Optical viewing apparatus such as binoculars and telescopes are widely used to magnify and view objects from afar. A common problem encountered with these apparatus is that the viewed image is often blurry and unclear due to movement of the viewing device caused, either intentionally or accidentally, by the individual operating the device. To alleviate this problem, image stabilizers employing image processing techniques are now commonly used in such apparatus, as well as in other viewing apparatus, to produce a sharp, clear, stable image. Image stabilizers are well known in the art. See K. Uormori et al., *Automatic Image Stabilizing System by Full-Digital Signal Processing*, IEEE Trans. on Consumer Electronics, Vol. 36, No. 3, at pp. 510–519, August 1990; M. Oshima et al., *VHS Camcorder with Electronic Image Stabilizer*, IEEE Trans. on Consumer Electronics, Vol. 35, No. 4, at pp. 749–758, November 1989; Y. Egusa et al., *An Electronic Video Camera Image Stabilizer Operated On Fuzzy Theory*, IEEE Conf. on Fuzzy Systems, at pp. 851–858, March 1992.

Conventional image stabilizers used in hand-held viewing apparatus require the use of large image matching fields in order to produce motion-compensated stabilized images. The disadvantage of such systems is that processing a large image matching field requires mathematically complex, time-consuming image processing techniques. An additional disadvantage of such systems is their expense. It is, therefore, an object of this invention to provide an image stabilization system which processes a small selectable portion of the viewed image in order to produce a clear motion-compensated stabilized image without the foregoing limitations found in conventional image stabilizers.

SUMMARY OF THE INVENTION

An image stabilization system for hand-held optical viewing devices wherein relative movement of a small selectable portion of the image being viewed is processed by image processing techniques in order to produce a stabilized image at a motion-compensated location,

BRIEF DESCRIPTION OF THE DRAWINGS

FIG. 1 shows an exemplary embodiment of the image stabilization system according to this invention.

FIG. 2 shows the original location of the inner frame containing the image of interest as seen in the viewing screen of the system of FIG. 1.

FIG. 3 shows the inner frame in a shifted location as seen in the viewing screen of the system of FIG. 1.

FIG. 4 shows the original location and various shifted locations of the inner frame as can be seen in the viewing screen of the system of FIG. 1.

FIG. 5 shows an alternative embodiment of the image stabilization system according to this invention.

DETAILED DESCRIPTION OF THE DRAWINGS

Referring to FIG. 1, there is shown an image stabilization system 10 according to the present invention. System 10 includes optical lenses 11A and 11B, solid state image sensor charge transfer devices (CTD) 12A and 12B, a miniaturized microcomputer 13, and viewing screens 14A and 14B. The image 22 of the object of interest which is to be stabilized is seen by system 10 through lens 11A and 11B. CTDs 12A and 12B digitize image 22 and microcomputer 13 then processes this digitized image to produce a motion-compensated stabilized image in viewing screens 14A and 14B.

System 10 permits use of a hand-held apparatus such as binoculars, telescopes or other similar devices for telescopic viewing at high magnification of image 22. Operator 23 is assumed to be in a stationary position and using system 10 in a non-panning mode. To use system 10, user 23 places his or her eyes 21A and 21B up to viewing screens 14A and 14B to view image 22 which is to be magnified. System 10 markedly reduces high-magnification blurring of image 22 caused by movement of the viewing apparatus equipped with system 10. System 10 has both military and civilian applications, having the ability to be used for surveillance and general telescopic viewing.

Referring to FIG. 2, there is shown total image frame 15 containing viewable circular inner frame 16 in which operator 23 sees the active area of image 22 when looking through viewing screens 14A and 14B. Inner frame 16 occupies approximately 20% of the total area of total image frame 15. Inner frame 16 includes a concentric transparent perimeter region 18 containing a small circular translucent image control frame 17. When used by operator 23, movement of the apparatus equipped with system 10 is detected by microcomputer 13 and motion vectors 30A and 30B are derived for displaying a motion-compensated stabilized viewable image in viewing screens 14A and 14B. When the apparatus equipped with system 10 is moved, inner frame 16 and thus also control frame 17 shift away, as shown in FIG. 3, from an initial reference position shown in FIG. 2. This shift in control frame 17 coordinates, and the change in inner frame angular position if there is angular movement of system 10, is detected by microcomputer 13 and used to reconstruct image 22 seen in inner frame 16 as a motion-compensated stabilized image in its original location as seen in viewing screens 14A and 14B.

The control frame 17 image is selectable by means of switch (not shown). The control frame 17 image location is chosen to contain predictably stationary visual background information. System 10 is best suited for image stabilization when control frame 17 contains a fixed, unordered pattern with distinct pattern differences in both the horizontal and vertical axes. The image of active viewing interest 22 which is to be stabilized is seen by operator 23 inside of inner frame 16 and not in control frame 17. The control frame 17 image occupies approximately 2–4% of the area of inner frame 16 and control frame 17 may be selected to be assigned to any location in region 18. Allowable mechanical movement of system 10 is such that the shifted inner frame 16 image remains within total image frame 15.

Image processing in system 10 is accomplished by means of miniaturized microcomputer 13. Microcomputer 13 provides means for: continuous movement of control frame 17 within perimeter region 18 of inner frame 16; repeated scanning of the shifted inner frame 16 image to find an image match between the reference image originally contained in control frame 17 and the shifted images subsequently contained in control frame 17; calculating the shift in coordinates between the reference control frame 17 image and the shifted control frame 17 images; and displaying a motion-compensated inner frame 16 image in viewing screens 14A and 14B. Microcomputer 13 performs the following sequence of image processing events: identifying and locating an initial reference image in selected control frame 17; searching for and capturing a matching control frame 17 image and image coordinates in each shifted location; and redisplaying original image 22 in viewing screens 14A and 14B at a motion-compensated location.

Image processing techniques occur at approximately 30 inner frame 16 image reconstruction events per second. Image processing is achieved using VLSI Multichip Module technology or equivalent high-speed, high-density electronic means to produce a recurring stabilized image in viewing screens 14A and 14B in a visually persistent manner. Since inner frame 16 occupies 20% of the area of total image frame 15 and since control frame 17 occupies 2–4% of the area of inner frame 16, the worst case pixel intensity image scan area is approximately 36% of total image frame 15. With inner frame 16 initially centered as shown in FIG. 2, the scan starts at a location 25% to the left and 25% above the selected control frame 17. Referring to FIG. 4 there are shown four extreme locations of control frame 17 with inner frame 16 located in each of four possible edges of total image frame 15.

If it is assumed that there is no rotational component to the shifted inner frame 16 image relative to that of the initial inner frame 16 image, then the first match during scanning of the translated control frame 17 image with the reference control frame 17 image occurs in a string of pixels near the first edge of control frame 17. Following this first match, scan path orientation is determined and the scan continues until the entire control frame 17 image matches the reference image originally contained in control frame 17. The search space is minimized by building on each pixel string match. The coordinates of both the reference and the shifted control frame 17 images with respect to total image frame 15 are recorded, and coordinate differences are used to determine motion-compensation for image 22 originally seen in inner frame 16 within total image frame 15. Coordinate capture, image comparison and image display in viewing screens 14A and 14B are performed repeatedly and rapidly. In this manner, viewed image 22 is effectively stabilized when the hand-held viewing apparatus is experiencing limited mechanical movement.

If angular rotation of the viewing apparatus equipped with system 10 relative to that of the initial inner frame 16 image is detected, then more complex prior art image processing techniques for image reduction followed by more complete image matching techniques are used. See J. K. Piak et al., *An Edge Detection Approach to Digital Image Stabilization Based on Tri-State Adaptive Linear Neurons*, IEEE Trans. on Consumer Electronics, Vol. 37, No. 3, at pp. 521–530, August 1991; J. K. Piak et al., *An Adaptive Motion Decision System for Digital Image Stabilizer Based on Edge Pattern Matching*, IEEE Trans. on Consumer Electronics, Vol. 38, No. 3 at pp. 607–616, August 1992. These techniques include efficient edge detection algorithms using edge-detected geometric pixel clusters to permit gross feature matching. This is followed by a higher resolution search for a best match between the reference control frame 17 image and the shifted control frame 17 image. Efficient edge detection pixel use accounts for only 3 to 5% of all pixels in control frame 17. This image processing results in angular and X-Y coordinate changes for the reference and "best match" shifted control frame 17 images relative to image 22 in total image frame 15. These changes are recorded and coordinate differences determined to position the motion-compensated display of the original inner frame 16 image within total image frame 15.

A location for control frame 17 is selected that contains the best stationary distinctive visual image detail (stationary relative to the central active region of viewable interest). Translucent control frame 17 travels around perimeter region 18 of inner frame 16 until stopped at a selected reference location by activating switch (not shown). The control frame 17 image shift, successful image match and redisplay of a motion-compensated image 22 in viewing screens 14A and 14B repeats as long as switch (not shown) is closed. Switch (not shown) may be opened and reclosed to reinitialize the reference control frame 17 image as often as needed so as to optimize control frame 17 selection in order to obtain a suitably stable viewable image.

Viewing screens 14A and 14B may be either a liquid crystal device yielding moderate resolution, i.e. 640×480 pixel density, or an optomechanical digital micromirror device (DMD) newly developed by Texas Instruments which yields a higher density 2048×1152 pixels in a display approximately 37×22 mm in size, see J. M. Younse, *Mirrors on a Chip*, IEEE Spectrum, at pp. 27–36, November 1993, or other appropriate electronic display. Use of the DMD requires a small white light source incident to the micromirror plane. Three DMDs and a suitable color wheel may be used in a color display, or one DMD may be used in a monochromatic display.

FIG. 5 shows an alternative embodiment of system 10 shown in FIG. 1, wherein system 10 employs an electromechanical piezoelectric motion detection system 9. When this alternative embodiment of system 10 is activated, motion vectors 30A and 30B produced by movement of the viewing apparatus equipped system 10 are sensed by piezoelectric motion detection system 9. When electronic system 9 is activated, the initial viewable image, occupying approximately 20% of the area of total image frame 15, as shown in the center of FIG. 4, is captured as a reference image. Motion vector coordinates 30A and 30B are continually captured and compared with that of the reference image and used to reconstruct viewable image 22 in viewing screens 14A and 14B. Viewing screens may be either a liquid crystal device, a DMD, or other suitable electronic display as previously discussed. Coordinate capture and image shift in viewing screens 14A and 14B continues as long as the system 10 is activated. The complexity of microcomputer 13 controlled image processing in this alternative embodiment as compared with the preferred embodiment discussed above is reduced since image matching and use of control box images are not required.

It will be understood that the embodiments described herein are merely exemplary and that a person skilled in the art may make many variations and modifications to the described embodiments utilizing functionally equivalent elements to those described. Any variations or modifications to the invention just described are intended to be included within the scope of said invention as defined by the appended claims.

What is claimed is:

1. An image stabilization apparatus for telescopic devices to stabilize an entire image occupying a field of view seen through the telescopic devices, comprising:

means for selecting a portion of said entire image, said means comprising a translucent image control frame imposed on an outer edge of said entire image; means to automatically move the translucent image control frame around said outer edge; and means to select a stationary reference image which is outlined within the translucent image control frame; and means for stabilizing said entire image, wherein said means for stabilizing said entire image comprises a miniaturized microcomputer, said microcomputer identifying and locating said reference image as an initial reference image, said microcomputer then searching for and capturing matching reference control frame images and image coordinates of the initial reference image in shifted locations, and realigning said entire image based on shifting the initial reference image in order to redisplay said entire image as a stabilized image at a motioned-compensated location.

2. The image stabilization apparatus according to claim 1, wherein said means for stabilizing said entire image comprises a miniaturized microcomputer and a piezoelectric motion detection system coupled thereto, said microcomputer capturing said selected portion of said entire image as a reference image and continually capturing and comparing motion vector coordinates produced by movement of said viewing device with said reference image in order to reconstruct said entire image at a motion-compensated stabilized location.

3. The image stabilization apparatus according to claim 1, wherein said field of view includes an inner frame containing a perimeter region around which said reference control frame travels, said inner frame occupying 20% of said field of view and said reference control frame occupying 2–4% of said inner frame.

4. An image stabilization apparatus for telescopic devices to stabilize an entire image occupying a field of view seen through the telescopic devices, comprising:

an optical lens through which an entire image is viewed;

a solid-state image sensor charge transfer device for digitizing said entire image, said charge transfer device being coupled to said optical lens;

a miniaturized microcomputer for selecting a portion of said digitized image, said microcomputer comprising means to generate a translucent image control frame which is imposed on an outer edge of said digitized image; means to automatically move the translucent image control frame around said outer edge; and means to select a stationary reference image which is outlined within the translucent image control frame; and means for stabilizing said entire image based upon relative movement of said stationary reference image, said microcomputer identifying and locating said stationary reference image as an initial reference image, said microcomputer then searching for and capturing matching reference control frame images and image coordinates of the initial reference image in shifted locations, and realigning said entire image based on shifting the initial reference image in order to redisplay said entire image as a stabilized image at a motioned-compensated location, said microcomputer being coupled to said charge transfer device; and a viewing screen in which said motion-compensated stabilized image is displayed, said viewing screen being coupled to said microcomputer.

5. The image stabilization system according to claim 4, wherein said microcomputer identifies and locates said selected portion of said entire image as an initial reference image, said microcomputer then searching in an optimized image field no greater than 36% of the total image field and capturing matching reference control frame images and image coordinates in shifted locations in order to redisplay said entire image at said motion-compensated stabilized location.

6. The image stabilization system according to claim 4, further comprising a piezoelectric motion detection system coupled to said microcomputer, said microcomputer capturing said selected portion of said entire image as a reference image and continually capturing and comparing motion vector coordinates produced by movement of said viewing device with said reference image in order to reconstruct said entire image at said motion-compensated stabilized location.

* * * * *